US005953660A

United States Patent [19]
Ryde et al.

[11] Patent Number: 5,953,660
[45] Date of Patent: Sep. 14, 1999

[54] SUPERVISORY AUDIO TONE DETECTION USING DIGITAL SIGNAL PROCESSING

[75] Inventors: Omar Ryde; Johnny Lidfors, both of Solna, Sweden

[73] Assignee: Telefonaktiebolaget LM Ericsson, Stockholm, Sweden

[21] Appl. No.: 08/561,055

[22] Filed: Nov. 22, 1995

[51] Int. Cl.[6] .................................................. H04Q 7/28
[52] U.S. Cl. ........................................ 455/423; 455/67.1
[58] Field of Search .................................. 455/436, 67.1, 455/438, 561, 562, 450, 423, 435, 437, 522

[56] References Cited

U.S. PATENT DOCUMENTS

| 3,983,379 | 9/1976 | Scott | 702/76 |
|---|---|---|---|
| 4,723,125 | 2/1988 | Elleaume | 342/194 |
| 5,001,742 | 3/1991 | Wang | 455/561 |

FOREIGN PATENT DOCUMENTS

| 589 595 | 3/1994 | European Pat. Off. . |
| WO 86/04762 | 8/1986 | WIPO . |

OTHER PUBLICATIONS

Welch, The Use of Fast Fourier Transform for the Estimation of Power Spectra: A Method Based on Time Averaging Over Short, Modified Periodograms, IEEE Transaction on Audio and Electroacoustics, entire document, Jun. 1967.

*Primary Examiner*—Dwayne D. Bost
*Assistant Examiner*—Myron K. Wyche
*Attorney, Agent, or Firm*—Burns, Doane, Swecker & Mathis, L.L.P.

[57] ABSTRACT

Methods and systems for measuring signal strength of supervisory audio tones (SATs) in radiocommunication systems are disclosed. Exemplary embodiments describe how such measurements may be performed using digital signal processing techniques, while reducing the amount of computing power, e.g., MIPs, used to accomplish this task. During each measurement interval a large number of SAT signal samples are received. Rather than process a complete measurement interval of received SAT samples, exemplary embodiments rely on a sliding average of samples which include both current and previous blocks of samples. In this way, the SAT signal strength can be reported relatively frequently to the system but without the number of computations that would be required to process all of the SAT signal samples received during a measurement interval.

13 Claims, 3 Drawing Sheets

SUPERVISORY AUDIO TONE DETECTION USING DIGITAL SIGNAL PROCESSING

RELATED APPLICATION

The following patent application is related to the present application: U.S. patent application Ser. No. 08/561,848, entitled "Signal-To-Noise Determination Using Digital Signal Processing" to Omar Ryde et al., filed on the same day as the present application. The disclosure of this related patent application is expressly incorporated here by reference.

BACKGROUND

The present invention is directed generally to radiocommunication systems and, more particularly, to techniques for measuring a signal strength of a supervisory audio tone in such systems.

In cellular mobile radio systems it is desirable that a mobile station with an established connection on a radio channel should be able to maintain the established connection when moving from one cell served by one base station to another cell served by another base station. The process by which a mobile station maintains an established connection when moving between cells in a cellular radio system is generally called handoff. It is also highly desirous that a mobile station with an established connection on a radio channel be able to maintain the connection when moving within the same cell, even if the radio channel being used is subject to increased interference. If the quality of the established connection falls below specified parameters it is further desirable to automatically disconnect the connection in the event that handoff or other signal processing fails to improve the quality of the connection.

In general, radiocommunication is only possible when the desired information-carrying radio signals have sufficient signal strength at the receiver and are sufficiently strong in relation to noise and interfering radio signals at the receiver. The minimum signal strength of course depends on the particular features of the system, e.g., the kind of modulation and receiver used. In order to determine if an established connection should continue on a selected radio channel between a mobile station and a base station, handoff and disconnect processes perform various measurements on radio signals at the intended base and/or mobile stations.

The first cellular mobile radio systems in public use were analog systems used to convey speech or other analog information. These systems comprised multiple radio channels for transmitting analog information between base and mobile stations by transmitting analog-modulated radio signals. In general, the signal measurements made during the handoff and disconnect processes in such systems were performed by the base stations. One such system is known as the Nordic Mobile Telephone system NMT 450. Another known analog cellular mobile radio system, of particular interest as background to the present invention, is the Advanced Mobile Phone Service (AMPS) mobile radio system utilized in the U.S.A.

Recently, digital cellular mobile radio systems for public use have been designed. Digital cellular mobile radio systems provide digital radio channels for transmitting digital or digitized analog information between base and mobile stations using digitally modulated radio signals. Digital cellular mobile radio systems may offer substantial advantages, e.g. greater system capacity per unit bandwidth, over analog cellular mobile radio systems. To achieve these advantages there are certain demands. In particular, channel supervision, handoff and disconnect processes need to be performed rapidly and allowed to be frequently carried out relative to conventional analog systems.

In contrast to the introduction of digital-only cellular mobile radio systems, like the GSM system employed in parts of Europe, in areas with existing analog cellular systems it has been proposed to introduce digital cellular mobile radio systems which are designed to cooperate with the existing analog cellular mobile radio systems. In this way large legacy customer bases will not suddenly find that their terminal equipment has become obsolete. System designers of these hybrid systems believe that the digital portion of the system can be gradually introduced and, over time, the number of digital channels can be gradually increased, while the number of analog channels is gradually decreased. In order to provide complete compatibility, such dual-mode systems should comport with both the analog and digital standards that have been adopted, for example the analog AMPS and TACS standards.

In AMPS, a supervisory audio tone, abbreviated SAT, is transmitted on analog communication channels. More specifically, a base station transmits a SAT to a mobile station which receives the SAT and transponds the tone back to the base station to close the loop. The reason for transmitting the SAT in AMPS is that, in an interference-limited mobile radiocommunication network, there should be some mechanism for the receiving entity (e.g., a base station), to identify the transmitting entity (e.g., a mobile station) or at least with high likelihood exclude interchange of transmitter entities without the need for continuous transmission of a transmitter identity. Thus, the base station expects to receive the same SAT that it sent out, i.e., on the same frequency. If a different SAT is received by the base station then the connection is perceived to be interfered with and may be disconnected. In order to qualify as a valid SAT, it must be received by the base station at some predetermined signal strength. The AMPS standard specifies that the SAT need not be determined continuously, but should be determined at least every 250 ms. Thus, conventional analog base stations measured the SAT strength using analog hardware components and supplied a SAT signal strength report to the network periodically, for example the RBS 882 manufactured by Telefonaktiebolaget LM Ericsson reported SAT signal strength every 20 ms.

Although dual-mode base stations and mobile stations continue to support analog system functions, such as SAT detection, the ways in which these functions are supported are continuously being improved to reduce cost and improve quality. With the increased power of digital signal processors (DSPs), system designers are interested in implementing many signal processing techniques previously implemented using analog hardware components as DSP routines. DSP implementation has the added attraction of reducing the number of components, and hence the size, of the base stations and mobile stations.

Of course, digital signal processing also has its limitations. One design tradeoff which system designers confront when trying to implement analog signal processing techniques as DSP routines is that of speed of execution of a routine versus the amount of DSP resources, e.g., the number of millions of instructions per second (MIPS), which are allocated to execute the routine. Since digital signal processing is not yet so cheap that the number of MIPS used for each routine are insignificant, system designers are called upon to develop innovative digital signal processing techniques that reduce the number of MIPs used so that the digital signal processor can handle as many tasks as possible.

SUMMARY

These and other drawbacks and limitations of conventional methods and techniques for measuring, for example, the SAT in radiocommunication systems are overcome according to the present invention. Exemplary embodiments describe how such measurements may be performed using digital signal processing techniques, while reducing the amount of computing power, e.g., MIPs, used to accomplish this task. During each measurement interval a large number of SAT signal samples are processed by the base station. Rather than use all of the SAT samples received during a measurement interval in a DSP measurement routine, exemplary embodiments of the present invention use a sliding average of samples which include both a block of signal samples received during the measurement interval and previous blocks of samples. In this way, the SAT signal strength can be reported relatively frequently to the system but without the number of computations that would be required to process all of the SAT signal samples received during a measurement interval.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

Figure 1:
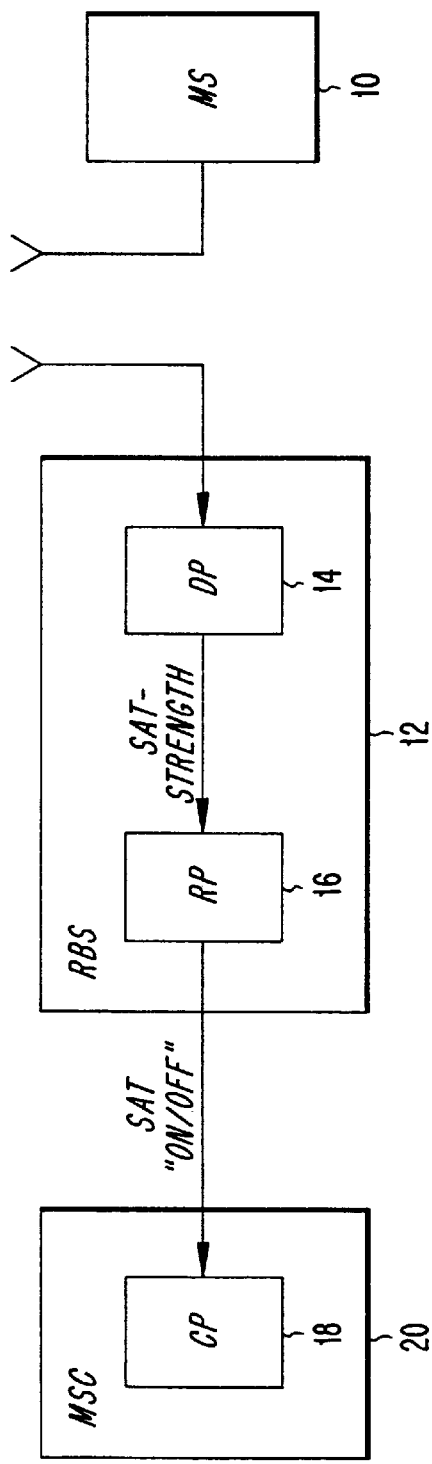
FIG. 1 is a block diagram generally illustrating SAT measurement and reporting in a radiocommunication system according to an exemplary embodiment of the present invention.

As described above, the supervisory audio tone (SAT) is used to monitor connections between base stations and mobile stations for analog radio traffic channels. To describe generally how the SAT is used, FIG. 1 illustrates exemplary functional units in a radiocommunication system by way of a general block diagram. A mobile station (MS) 10 transmits a SAT to the radio base station (RBS) 12 during the time that it is connected to the RBS 12 via an analog traffic channel. The SAT is detected and measured by, according to the present invention, a digital processor (DP) or digital signal processor (DSP) 14 in radio base station 12. The digital processor 14 reports the received signal strength of the SAT to another processor 16 (sometimes referred to as a regional processor (RP)) in RBS 12. The processor 16 interprets the reported SAT signal strength as indicating that the SAT is present (on) or not present (off) by, for example, comparing the reported signal strength with some predetermined signal strength threshold. This interpretation is then forwarded to the network via a central processor (CP) 18 of mobile switching center (MSC) 20. Since many of the details of base station hardware per se are not germane to a discussion of the present invention, Applicants have omitted such details to avoid obscuring the invention. Readers interested in additional details of base stations including digital signal processors, generally, are directed to U.S. Pat. No. 5,295,178 which disclosure is incorporated here by reference.

Figure 2:
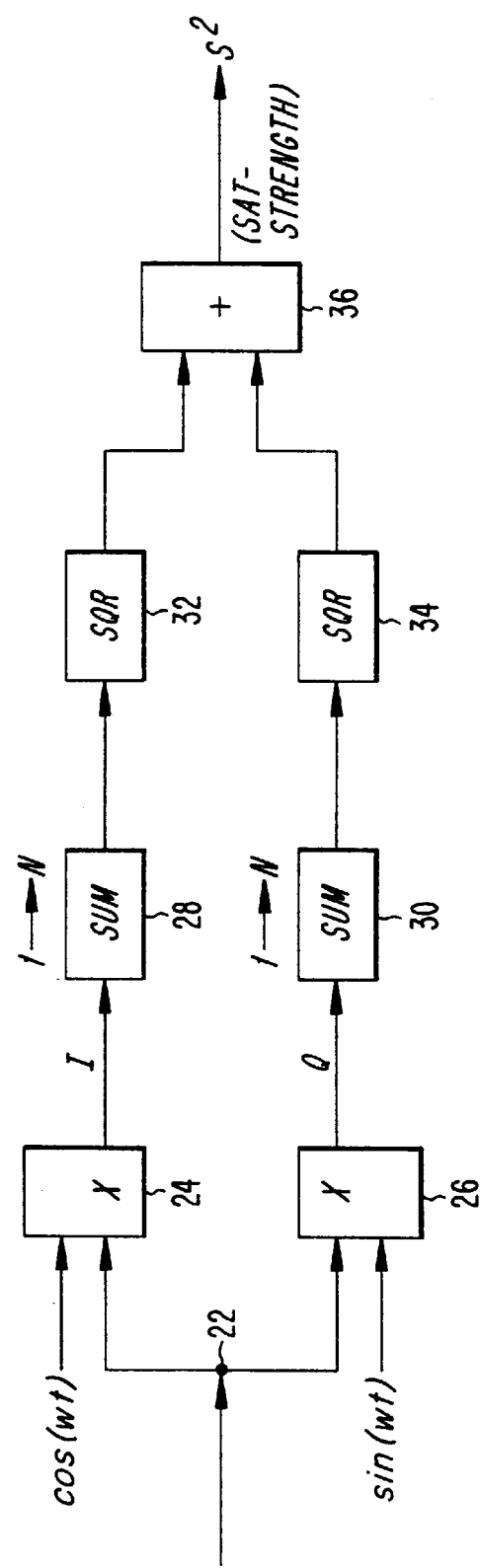
FIG. 2 is a block diagram illustrating a digital fourier transform applied to provide an indication of SAT signal strength.

Conventionally, analog hardware was used to measure the signal strength of the SAT in radio base stations. The SAT signal strength measurement technique applied in these conventional systems can be recreated in a digital signal processing routine by performing a digital fourier transform on the received SAT samples as illustrated in FIG. 2. Therein, an incoming SAT sample stream is received at input node 22. The sample rate of the incoming stream will depend upon various design considerations but can be, for example, 16 ksamples/second. Those skilled in the art will be familiar with the way in which a digital fourier transform is performed, however a brief description of the functional blocks of FIG. 2 is provided below for completeness.

The incoming sample stream is separated into its real (inphase) and imaginary (quadrature) components at mixers 24 and 26, respectively. The frequency chosen for mixing at blocks 24 and 26 is that of the expected SAT to be returned by the mobile station. A number of different SAT frequencies may be used in a radiocommunication system to differentiate between neighboring cell transmissions. For example, three SAT frequencies, 5970, 6000 and 6030 Hz, are used in AMPS.

A predetermined number of sample components N are summed at summers 28 and 30, respectively. Selection of the number of sample components N to be summed for each measurement interval is dependent upon, among other considerations, the resolution needed to distinguish between different SAT frequencies using the digital fourier transform. Conventionally, the SAT was measured continuously since analog hardware was used to perform this function and, accordingly, resolution of the measurement was not a significant problem. In the digital domain, however, measurement resolution becomes an issue. Using the AMPS standard as an example, a minimum resolution of 30 Hz is needed to distinguish between the three different SAT frequencies that are available. To provide better performance in distinguishing between SAT frequencies, a resolution of less than 30 Hz, e.g., 10 Hz, is preferable.

With increased resolution, however, comes the need for increased computation by the digital signal processor 14, i.e., more MIPS being used for this routine. It has been determined that providing a continuous SAT measurement is not feasible because of the number of computations required in the DSP to implement such a function continuously. Thus, Applicants have considered various alternatives. For example, to provide a 1 Hz resolution in the digital fourier transform routine would require, in the above-example where the input sample stream has a rate of 16 ksamples/second, summers 28 and 30 to add 16,000 signal components for each branch of the digital fourier computation, i.e., N=16,000. By way of contrast, a 10 Hz resolution can be achieved using N=1600. A 10 Hz resolution has been deemed by Applicants to provide a desirable balance between the competing objectives of better detection performance and using fewer DSP computational resource requirements, however those skilled in the art will appreciate that the inventive concepts disclosed herein can be applied to any desired computational resolution.

The outputs of summers 28 and 30 are applied to square operators 32 and 34, respectively, the results of which are added at adder 36 to complete the digital fourier transform. This result can then be reported from digital signal processor 14 to regional processor 16 for threshold detection as described above. However, another difficulty arises in using the implementation of the digital fourier transform as illustrated in FIG. 2. When using the exemplary 10 Hz computational resolution to generate a SAT signal strength output $S^2$ of the routine illustrated in FIG. 2, the regional processor 16 receives a report only once every 100 ms. By way of contrast, conventional analog systems operating in accordance with AMPS provide SAT signal strength reports every 20 ms. In order to be compatible with this existing standard it is desirable that the output rate of the routine of FIG. 2 be increased to 20 ms, but without adding to the number of computations to be performed during each measurement interval by the digital signal processor 14.

Figure 3:
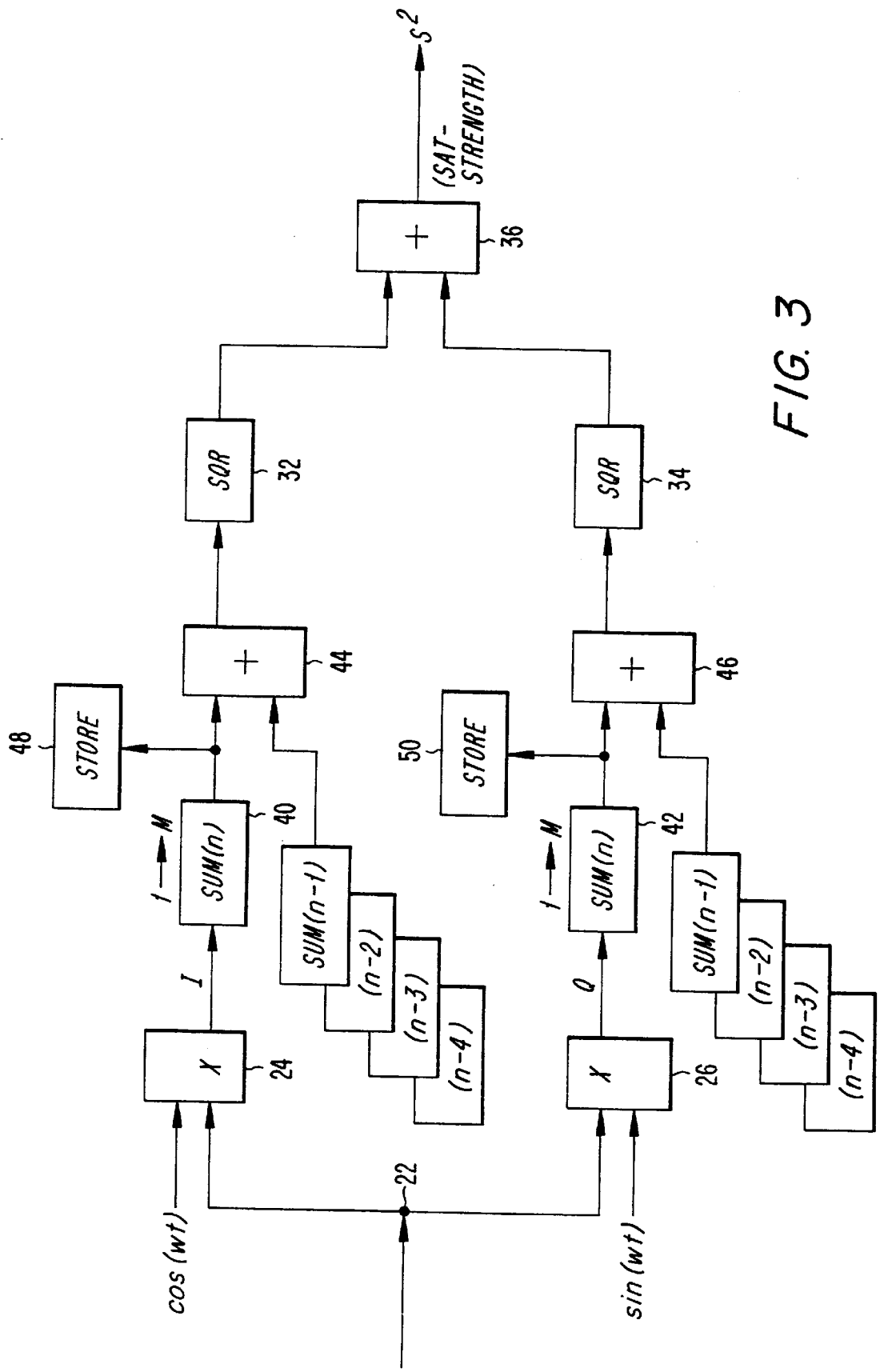
FIG. 3 is a block diagram of an exemplary embodiment of the present invention wherein SAT signal strength is calculated using both current and previous received samples.

FIG. 3 illustrates an exemplary technique for achieving a shorter reporting or update interval. Therein, those blocks which perform the same function in the digital fourier transform routine as described with respect to FIG. 2 retain the same reference numeral and are not described again here. According to Nyquist's sampling theorem, since the SAT tones are transmitted at about 6 kHz, at least 12 ksamples/s are needed to accurately digitize these tones. Sixteen ksamples/s has been selected as an exemplary incoming sampling rate as it is a convenient power of two. In order to reduce the computational time needed to provide a SAT signal strength update to the system without changing the resolution of the computation, the exemplary embodiment of FIG. 3 computes the digital fourier transform using the number of samples M received during the update period along with a number of previously received (and stored) samples N–M needed to provide adequate resolution to the computation. A numerical example will serve to better explain this concept.

Suppose that, as with the example of FIG. 2, the input sample stream to node 22 of FIG. 3 is again 16 ksamples/s. Given that an output is desired every 20 ms, 320 samples will be received during every update interval, i.e., M=320. Thus for every update interval n, the summers 40 and 42 will each operate on 320 sample components. If, for example, a computational resolution of 10 Hz is desired, however, an additional 1600–320=1280 sample components are needed for the digital fourier transform. These additional sample components are provided, according to this exemplary embodiment of the present invention, by adding the previous four outputs from summer 40, i.e., those produced at update intervals n-1, n-2, n-3 and n-4, to the current output at update interval n in adder 44. Similarly, for the imaginary components, the previous four outputs of summer 42 are added to the current output in adder 46. In order to retain the historical data needed to provide this sliding average of samples to the digital fourier transform, each output of summers 40 and 42 is stored as indicated by blocks 48 and 50, respectively. Since only a certain number of historical outputs are needed, e.g., four in the previous example, the memory device(s) (not shown) used to store these historical outputs can be, for example, circular buffers which retain only the most recent outputs.

This exemplary SAT measurement technique can also be described using pseudo code as set forth below.

```
BEGIN
    sum_i = 0;
    sum_q = 0;
```

-continued

```
FOR k=1 TO 320 DO
BEGIN
    sum_i = sum_i + (in_frame[k] *
             cos(2*PI*SAT_FREQ*count100/1600));
    sum_q + sum_q = (in_frame[k] *
             sin(2*PI*SAT_FREQ*count100/1600));
    IF   count100 > = 1600 THEN
             count100 = 0;
    ELSE
             count 100 = count100 + 1;
END
delta_sum_i [count20] = sum_i;
delta_sum_q [count20] = sum_q;
IF count20 = 5 THEN
    count 20 = 1
ELSE
    count20 = count20 + 1;
sum_sat_i = 0;
sum_sat_q = 0;
FOR k = 1 TO 5 DO
BEGIN
    sum_sat_i = sum_sat_i + delta_sum_i[k];
    sum_sat_q = sum_sat_q + delta_sum_q[k];
END
sat_strength = 10*LOG10(SQR(sum_sat_i) + SQR(sum_sat_q));
END
```

Figure 4A:
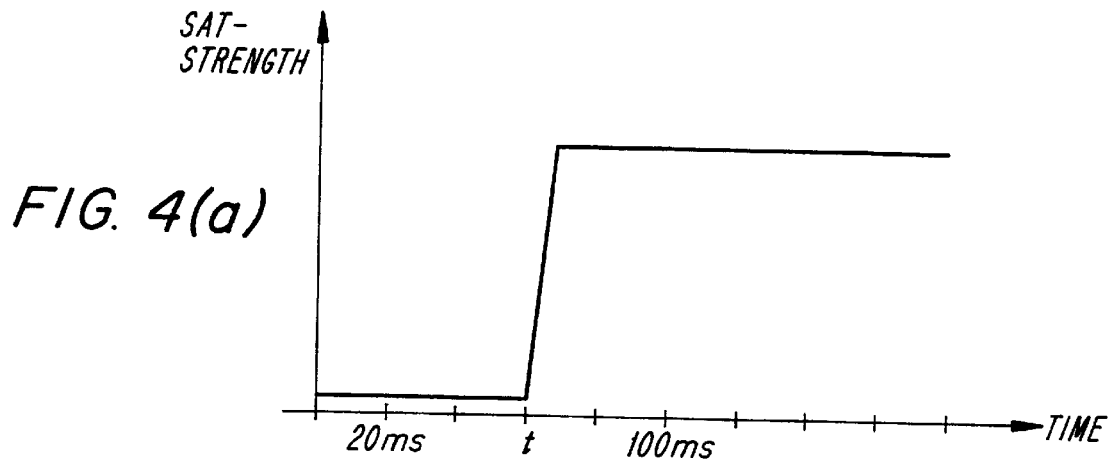
FIG. 4(a) is a graph illustrating a SAT tone signal strength over the air interface.
Figure 4B:
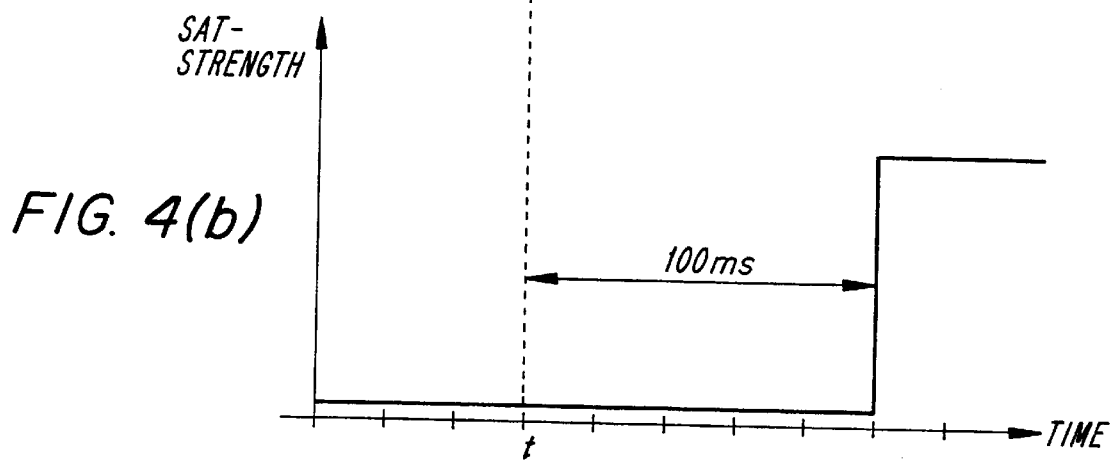
FIG. 4(b) is a graph illustrating an exemplary measurement of the SAT tone of FIG. 4(a) using the routine of FIG. 2.
Figure 4C:
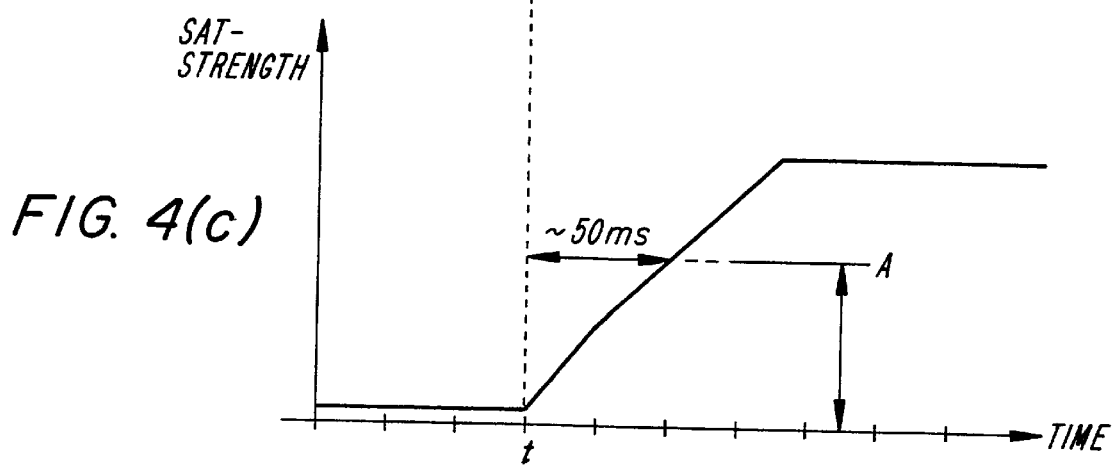
FIG. 4(c) is a graph illustrating an exemplary measurement of the SAT tone of FIG. 4(a) using the routine of FIG. 3.

The graphs of FIGS. 4(a) through 4(c) are used to describe the results which can be achieved by the present invention. In FIG. 4(a), a mobile station begins to transmit the SAT at time t. Thus, FIG. 4(a) illustrates the signal strength of the SAT over time as it might appear in the air interface. FIG. 4(b) illustrates the measurement and detection of the SAT signal strength using the routine of FIG. 2 in a "worst case" scenario. That is, assume that the time t at which the mobile station begins to transmit the SAT is at the very beginning of a measurement interval of the routine of FIG. 2. Since the routine of FIG. 2 takes 100 milliseconds to provide an update to the system, in the worst case, as shown in FIG. 4(b), there will be a 100 millisecond delay between transmission of the SAT by the mobile station and detection of the SAT by the system.

By way of comparison, FIG. 4(c) illustrates how the routine of FIG. 3 handles the SAT tone of FIG. 4(a). In this case, since a sliding average is used, the worst case scenario of FIG. 4(b) is always avoided. As each new 20 millisecond lock of samples is added after time t at adders 44 and 46, the reported SAT signal strength gradually increases as illustrated in FIG. 4(c). As described above, SAT detection is based upon, among other things, the SAT signal strength exceeding a predetermined threshold. In the exemplary graph of FIG. 4(c), the threshold A is set at such a level that it takes approximately 50 milliseconds for the routine of FIG. 3 to report a SAT signal strength which exceeds this threshold. Thus, a dramatic improvement in performance is achieved by using the sliding average technique illustrated in FIG. 3 relative to the standard digital fourier transform illustrated in FIG. 4(b).

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What we claim is:

1. A method for measuring a signal strength of a supervisory audio tone using a digital signal processor, said method comprising the steps of:

providing a computational resolution;

providing a system update interval;

determining a first number N of samples of said supervisory audio tone which are needed to provide said computational resolution based upon an input sample rate;

determining a second number M of samples of said supervisory audio tone which can be summed during each said system update interval by said digital signal processor, said second number of samples being less then said first number N of samples;

summing said second number M of samples during each system update interval and storing a resultant sum;

adding (N/M)-1 previously stored resultant sums to said resultant sum to create a composite sum;

performing a digital fourier transform on said composite sum, whereby said first number of samples N are used in said digital fourier transform; and reporting said signal strength of said supervisory audio tone to said system based upon a result of said digital fourier transform.

2. The method of claim 1, further comprising the step of:

determining whether to disconnect a connection between a mobile station and a base station based upon said reported signal strength.

3. The method of claim 1, wherein said computational resolution is 10 Hz.

4. The method of claim 1, wherein said system update interval is 20 ms.

5. A method for measuring a signal strength comprising the steps of:

summing samples of a signal sampled at a sampling rate over a current measurement interval and a plurality of previous measurement intervals to output a composite sum;

using said composite sum in a digital fourier transform computation to generate an indication of said signal strength, wherein said plurality of previous measurement intervals contains a number of samples which is sufficient to provide a predetermined resolution output from said digital fourier transform computation, and further wherein said number of samples is equal to the ratio of said sampling rate and said predetermined resolution minus the sampling rate multiplied by a duration of said current measurement interval.

6. The method of claim 5, further comprising the step of:

identifying a quality of a connection in a radiocommunication system based upon said indication of said signal strength.

7. A supervisory audio tone measurement system comprising:

an input node for receiving a sample stream at a predetermined sample rate;

a summation device for summing a first number of samples of said received sample stream over a duration to generate a first output;

a memory device for storing said first output;

an adder, downstream of said summation device, for receiving said first output of said summation device and adding thereto a plurality of previous outputs of said summation device which have been stored in said memory to generate a second output; and a square operator for squaring the second output, wherein said adder adds a number of previous outputs of said summation device to said first number of samples summed by said summation device such that a sum of samples represented by said number of previous outputs plus said first number of samples summed by said summation device is equal to a number of samples needed to provide a predetermined computational resolution, wherein said sum of samples represented by said number of previous outputs contains a second number of samples equal to the ratio of the predetermined sample rate and the predetermined computational resolution minus the predetermined sample rate multiplied by the duration.

8. The supervisory audio tone measurement system of claim 7, wherein said predetermined computational resolution is 10 Hz.

9. A base station comprising:

means for receiving a SAT; and a digital signal processor (DSP) for measuring a signal strength of said SAT, wherein said DSP operates on a block of current samples in conjunction with previously received blocks of samples to provide a sliding average measurement of said signal strength of said SAT, wherein said block of current samples is measured over substantially an entire duration of a SAT update interval, and wherein said sliding average measurement is performed by summing said block of current samples with a number of said previously received blocks of samples, each of said number of previously received blocks of samples measured over substantially an entire duration of a SAT update interval.

10. The base station of claim 9, wherein said digital signal processor performs a digital fourier transform on said block of current samples added to said previously received samples.

11. The base station of claim 10 wherein said block of current samples is less than a number of samples needed to satisfy Nyquist's theorem and said previously received samples to satisfy said theorem.

12. The base station of claim 11, further comprising:

a circular buffer for storing each successive block of current samples as said previously received samples.

13. The base station of claim 12, wherein said circular buffer is of a size to store N blocks of M samples, wherein N×M is sufficient to satisfy said theorem.

* * * * *